United States Patent [19]

Zondler et al.

[11] 3,718,610

[45] Feb. 27, 1973

[54] CURABLE MIXTURES OF EPOXIDE RESINS AND PIPERIDINE DERIVATIVES

[75] Inventors: Helmut Zondler, Allschwil, Switzerland; Wolfgang Pfleiderer, Konstanz, Germany

[73] Assignee: Ciba-Geigy AG, Basle, Switzerland

[22] Filed: March 17, 1971

[21] Appl. No.: 125,381

[30] Foreign Application Priority Data

March 23, 1970 Sweden .............................. 4338/70

[52] U.S. Cl. .............. 260/2 N, 106/311, 117/161 ZB, 161/184, 260/9, 260/18 EP, 260/28, 260/30.4 EP, 260/47 EN, 260/59, 260/75 NC, 260/78.4 EP, 260/834, 260/836

[51] Int. Cl. ............................................ C08g 30/14

[58] Field of Search ..... 260/47 EN, 2 N, 78.4 EP, 59, 260/77.5, 293 D, 293.2

[56] References Cited

UNITED STATES PATENTS 3,544,590   12/1970   Kittleson ................................ 260/2

OTHER PUBLICATIONS

Compt. Rendus T256 Colonge et al. 1963 (pp. 2638, 2639)

Primary Examiner—William H. Short
Assistant Examiner—T. Pertilla
Attorney—Harry Goldsmith, Joseph G. Kolodny and Mario A. Monaco

[57] ABSTRACT

Curable moulding compositions, coating compositions and adhesive compositions which contain a polyepoxide compound, for example a liquid polyglycidyl ether of bisphenol A, and, as the curing agent, a substituted 4-amino-3-aminomethyl-piperidine for example 1-methyl-4-amino-3-aminomemethylpiperidine. The curing of the curable mixtures according to the invention to give shaped articles and the like is appropriately carried out in the temperature range of 20° to 150° C.

13 Claims, No Drawings

CURABLE MIXTURES OF EPOXIDE RESINS AND PIPERIDINE DERIVATIVES

The subject of the present invention are curable mixtures which are suitable for the manufacture of shaped articles, impregnations, coatings and adhesive bonds, and which are characterized in that they contain (a) a polyepoxide compound with an average of more than one epoxide group in the molecule and (b) as the curing agent, a substituted 4-amino-3-aminomethyl-piperidine of the general formula

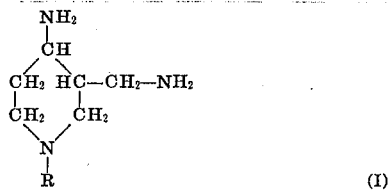

(I)

wherein R denotes an alkyl radical, preferably containing one to seven carbon atoms, or an alkenyl, cycloalkyl, cycloalkenyl, aralkyl or aryl radical, especially a lower alkyl radical with one to four carbon atoms.

Some compounds of the formula (I) have been described in the literature, for example 1-methyl-4-amino-3-aminomethylpiperidine [J. Colonge, G. Descates, G. Fresnay, Compt.Rend. 256,2638–9 (1963)] which it was possible to manufacture by reduction of 1-methyl-4-amino-3-cyanotetrahydropyridine by means of sodium in alcohol.

Their use as curing agents for epoxide resins has, however, not been mentioned, or made obvious to the expert, anywhere in the literature.

In general, the compounds of the formula (I) can be manufactured conveniently by hydrogenating substituted 4-amino-3-cyano-1,2,5,6-tetrahydropyridines of the formula

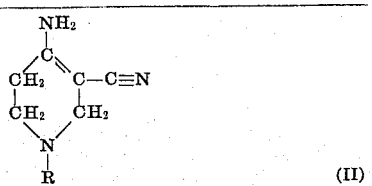

(II)

wherein R has the same meaning as in formula (I), in a manner which is in itself known.

The hydrogenation is preferably carried out in the presence of a catalyst.

Raney nickel or Raney cobalt are particularly effective as hydrogenation catalysts. It is also possible to use a cobalt oxide catalyst on a suitable carrier material, this catalyst being reduced in a stream of hydrogen to a cobalt metal catalyst.

Further possible hydrogenation catalysts are catalysts based on platinum and based on palladium, which can be employed as platinum black or palladium black, as colloidal platinum or palladium, or as platinum oxide or palladium oxide or platinum hydroxide or palladium hydroxide catalysts.

Possible carrier materials for such catalysts are the customary materials, such as asbestos, pumice, kieselguhr, silica gel, silica, active charcoal, and the sulphates, carbonates or oxide of the metals of groups II to VIII of the periodic system, especially of magnesium, calcium, barium, zinc, aluminium, iron, chromium and zirconium.

The hydrogenation can be carried out according to the methods which are customary in the laboratory and in industry, either without pressure, for example in a duck-shaped shaking vessel, or under pressure in an autoclave.

As solvents for the hydrogenation, it is possible to employ the organic solvents customarily used together with the abovementioned types of catalyst, and in particular, preferably, lower aliphatic alcohols, such as methanol or ethanol.

The catalytic reduction is as a rule carried out by mixing the suspension or solution of the 4-amino-3-cyano-1,2,5,6-tetrahydropyridine with the catalyst and passing hydrogen gas into the reaction mixture. The hydrogenation can in principle be carried out at atmospheric pressure and room temperature, but increased pressures, of 50 atmospheres and above, and increased reaction temperatures, in the range of 50° to 150° C, are preferred. The hydrogenation is continued until no further hydrogen is absorbed. After completion of the hydrogenation, the catalyst is separated off, for example by filtration, and the solvent is distilled off.

The hydrogenation can also be carried out according to other known methods, for example by treatment with alkali metals, such as metallic sodium, in alcoholic solution.

The substituted 4-amino-3-cyano-1,2,5,6-tetrahydropyridines used as starting substances can be obtained by cyclization of bis-cyanoethylated amines of the formula

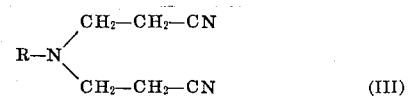

(III)

wherein R has the same meaning as in formula (I).

To manufacture the curable mixtures, 0.5 to 1.3 equivalents, preferably approx. 1.0 equivalent, of nitrogenbonded active hydrogen atoms of the substituted 4-amino-3-aminomethylpiperidine of the formula (I) are appropriately used per 1 equivalent of epoxide groups of the polyepoxide compound (a).

Possible polyepoxide compounds (a) are above all those with an average of more than one glycidyl group, β-methylglycidyl group or 2,3-epoxycyclopentyl group bonded to a hetero-atom (for example sulphur, and preferably oxygen or nitrogen); the following may be mentioned especially: bis-(2,3-epoxycyclopentyl)-ether; di- or poly-glycidyl-ethers of polyhydric aliphatic alcohols, such as 1,4-butanediol, or polyalkylene glycols, such as polypropylene glycols; di- or poly-glycidyl-ethers of cycloaliphatic polyols, such as 2,2-bis-(4'-hydroxycyclohexyl)-propane; di- or poly-glycidylethers of polyhydric phenols, such as resorcinol, bis-(p-hydroxyphenyl)methane, 2,2-bis(p-hydroxyphenyl)-propane(=diomethane), 2,2-bis(4'-hydroxy-3',5'-dibromophenyl)-propane, 1,1,2,2-tetrakis-(p-hydroxyphenyl)-ethane, or of condensation products of phenols with formaldehyde, obtained under acid conditions, such as phenol novolacs and cresol novolacs; di- or poly-(β-methylglycidyl)-ethers of the above-mentioned polyhydric alcohols or polyhydric phenols; polyglycidyl esters of polybasic carboxylic acids, such as phthalic acid, terephthalic acid, Δ⁴-tetrahydrophthalic acid and hexahydrophthalic acid; N-glycidyl derivatives of amines, amides and heterocyclic nitrogen bases, such as N,N-diglycidyl-aniline, N,N-diglycidyl-toluidine, N,N,N',N'-tetraglycidyl-bis(p-aminophenyl)-methane; triglycidyl-isocyanurate; N,N'-diglycidyl-ethyleneurea; N,N'-diglycidyl 5,5-dimethyl-hydantoin and N,N'-diglycidyl-5-isopropylhydantoin; N,N'-diglycidyl-5,5-dimethyl-6-isopropyl-5,6-dihydro-uracil.

If desired, active diluents, such as, for example, styrene oxide, butyl-glycidyl-ether, isooctyl-glycidyl-ether, phenyl-glycidyl-ether, cresyl-glycidyl-ether, and glycidyl esters of synthetic, highly branched, mainly tertiary, aliphatic monocarboxylic acids ("CARDURA E") can be added to the polyepoxides to lower the viscosity.

The curing of the curable mixtures according to the invention to give shaped articles and the like is appropriately carried out in the temperature range of 20° to 150° C. The curing can, in a known manner, also be carried out in two or more stages, with the first curing stage for example being carried out at room temperature and the post-curing at a higher temperature.

The curing can, if desired, also be carried out in 2 stages by first prematurely stopping the curing the reaction, or carrying out the first stage at room temperature or only slightly elevated temperature, whereby a curable precondensate which is still fusible and soluble (a so-called "B-stage") is obtained from the epoxide component (a) and the amine curing agent (b). Such a precondensate can, for example, serve for the manufacture of prepregs, compression moulding compositions or especially sintering powders.

In order to shorten the gelling times or curing times, known accelerators for the amine curing reaction, for example monophenols or polyphenols, such as phenol or diomethane, salicylic acid, tertiary amines or salts of thiocyanic acid, such as NH₄SCN, can be added.

The term "curing" as used here denotes the conversion of the soluble, either liquid or fusible, polyepoxides into solid, insoluble and infusible, three-dimensionally cross-linked products or materials, and in particular, as a rule, with simultaneous shaping to give shaped articles, such as castings, pressings, laminates and the like or "sheet-like structures" such as coatings, lacquer films or adhesive bonds.

The curable mixtures, according to the invention, of polyepoxide compounds (a) and substituted 4-amino-3-aminomethylpiperidine of the formula (I) as the curing agent (b) can furthermore be mixed, in any stage before curing, with customary modifiers, such as extenders, fillers and reinforcing agents, pigments, dyestuffs, organic solvents, placticizers, flow control agents, agents for conferring thixotropy, flame-proofing substances or mould release agents.

As extenders, reinforcing agents fillers and pigments which can be employed in the curable mixtures according to the invention there may, for example, be mentioned: coal tar, bitumen, textile fibres, glass fibers, asbestos fibers, boron fibers, carbon fibers, cellulose, polyethylene powder, polypropylene powder; quartz powder; mineral silicates, such as mica, asbestos powder and slate powder; kaolin, aluminium oxide trihydrate, chalk powder, gypsum, antimony trioxide, bentones, silica aerogel ("AEROSIL"), lithopones, baryte, titanium dioxide, carbon black, graphite, oxide pigments, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, and ethylene glycol monomethyl ether, monoethyl ether and monobutyl ether.

As plasticizers for modifying the curable mixtures, dibutyl phthalate, dioctyl, phthalate, and dinonyl phthalate, tricresyl phosphate, trixylenyl phosphate and polypropylene glycols can for example be employed.

As flow control agents when employing the curable mixtures particularly in surface protection, silicones, cellulose acetobutyrate, polyvinyl butyral, waxes, stearates and the like (which can in part also be used as mould release agents) can for example be added.

Especially for use in the lacquer field, the polyepoxide compounds can furthermore be partially esterified in a known manner with carboxylic acids, such as, in particular, higher unsaturated fatty acids. It is furthermore possible to add other curable synthetic resins, for example phenoplasts or aminoplasts, to such lacquer resin formulations.

The manufacture of the curable mixtures according to the invention can be carried out in the customary manner with the aid of known mixing equipment (stirrers, kneaders, rolls and the like).

The curable epoxide resin mixtures of the invention are above all employed in the fields of surface protection, the electrical industry, laminating processes and the building industry. They can be used, in each milliliter in a formulation suited to the particular end use, in the unfilled or filled state, optionally in the form of solutions or emulsions, as paints, lacquers, sintering powders, compression moulding compositions, injection moulding formulations, dipping resins, casting resins, impregnating resins, binders and adhesives, tool resins, laminating resins, sealing and filling compositions, floor covering compositions and binders for mineral aggregates.

In the examples which follow, unless otherwise stated, parts denote parts by weight and percentages denote percentages by weight. The relationship of parts by volume to parts by weight is as of the milliliter to the gram.

The following epoxide resin was used for the manufacture of curable mixtures described in the examples:

Epoxide resin A

Polyglycidyl ether resin (technical product) manufactured by condensation of diomethane (2,2-bis(P-hydroxyphenyl)-propane) with a stoichiometric excess of epichlorohydrin in the presence of alkali, which consists mainly of diomethane-diglycidyl-ether of the formula

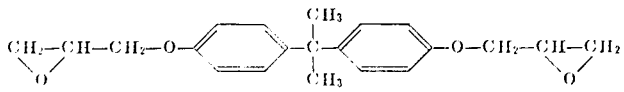

is liquid at room temperature, and has the following characteristics:
Epoxide content: 5.1 to 5.5 epoxide equivalents/kg
Viscosity (Hoeppler) at 25° C: 9000 to 13000 cP.

Epoxide resin B

Diglycidyl ether resin (technical product) manufactured by condensation of hydrogenated diomethane (2,2-bis-(p-hydroxycyclohexyl)-propane) with a stoichiometric excess of epichlorohyrin in the presence of alkali, consisting mainly of hydrogenated diomethane-diglycidyl-ether of the formula

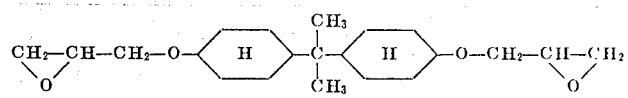

which is liquid at room temperature and has an epoxide content of 4.46 epoxide equivalents/kg.

Epoxide resin C

Tetrahydrophthalic acid diglycidyl ester having the following characteristics:
Epoxide content: 6.45 equivalents/kg
Viscosity (Hoeppler) at 25°C: 450–550 cP.

To determine the mechanical and electrical properties of the mouldings which can be manufactured from the curable mixtures described in the examples which follow, sheets of size 135 × 135 × 4 mm were manufactured for determination of the flexural strength, deflection, impact strength and water absorption. The test specimens (60 × 10 × 4 mm) for determining the water absorption and for the flexural test and impact test (VSM 77,103 and VSM 77,105 respectively) were machined from the sheets.

The 4-amino-3-aminomethylpiperidines used as curing agents in the examples which follow were manufactured as follows:

EXAMPLE A

Manufacture of 1-methyl-4-amino-3-aminomethyl-piperidine (J. Colonge, G. Descates, G. Fresnay; Compt.Rend. 256, 2638–9 [1963])

a. 150 g of recrystallized and well-dried 1-methyl-4-amino-3-cyano-1,2,5,6-tetrahydropyridine are suspended in 500 ml of methanol and hydrogenated in a vibrated autoclave by means of Raney nickel, activated with 2 percent of palladium, at 100°C and approx. 100 atmospheres $H_2$. The absorption of $H_2$ is complete after 5 hours. The catalyst is filtered off and the methanol is removed on a rotary evaporator (bath temperature not exceeding 30° C). The residue is fractionated through a 40 cm packed column. Yield: 57.9 g (41.5 percent). Boiling point 112°–19°C/12 mm Hg (in the literature, J. Colonge et al., 74°C/0.5 mm Hg.).

For analysis, a fraction was taken at boiling point 116°–17b$LC$/12 mm Hg.
Analysis: $C_7H_{17}N_3$ (M = 143.23)
Calculated: C 58.70  H H 11.96  N N 29.33
Found:      C 58.56  H 11.66   N 29.57

The mass spectrum does not show the molecular peak at $m/e$ 143. Instead of this, a fragment produced by splitting off $NH_3$ occurs at $m/e$ 126. A main fragment has mass $m/e$ 30 and corresponds to $CH_2 = ^{\oplus}NH_2$.

The NMR spectrum in $CCl_4$ is very complicated. The $N-CH_3$ group at 2.15 δ and 4 NH protons at 1.05 δ can be detected.

IR-spectrum:

| Band [cm⁻¹] | Interpretation |
| --- | --- |
| 3380 m | Stretching vibration of $NH_2$ |
| 3300 m | Stretching vibration of $NH_2$ and NH |
| 1610 st | Deformation vibration of $NH_2$ | b. 96 g (0.7 mol) of 1-methyl-4-amino-3-cyano-1,2,5,6-tetrahydropyridine are hydrogenated, in a solution of 100 g of ammonia in 300 ml of ethanol, over the course of 4 hours in an autoclave at 125° C and 100 atmospheres, in the presence of 10 g of Raney nickel. The catalyst is filtered off, the filtrate is concentrated on a rotary evaporator, and the residue is first distilled in vacuo without a column. 75.4 g of crude amine of boiling point 30°–110°C/10 mm Hg are obtained. Fractional distillation through a rotating strip column yields 66.4 g (66.3 percent) of 1-methyl-4-amino-3-aminomethylpiperidine of boiling point 107°–109°C/9 mm Hg.
Analysis: $C_7H_{17}N_3$ (M = 143.23)
Calculated: C 58.70  H 11.96  N 29.33
Found:      C 58.56  H 11.66  N 29.57

The mass spectrum does not show the molecular peak at $m/e$ 143. Instead of this, a fragment produced by splitting off $NH_3$ occurs at $m/e$ 126. A main fragment has mass $m/e$ 30 and corresponds to $CH_2 = ^{\oplus}NH_2$.

The NMR spectrum in $CCl_4$ is very complicated. The $N-CH_3$ group at 2.15 δ and 4 NH protons at 1.05 δ can be detected.

IR-spectrum:

| Band [cm⁻¹] | Interpretation |
| --- | --- |
| 3380 m | Stretching vibration of $NH_2$ |
| 3300 m | Stretching vibration of $NH_2$ and NH |
| 1610 st | Deformation vibration of $NH_2$ |

1-Methyl-4-aminopiperidine and 1,3-dimethyl-4-aminopiperidine can be detected as by-products in the first runnings.

EXAMPLE B

Manufacture of 1-n-butyl-4-amino-3-aminomethyl-piperidine

Stage 1: 1.5 g sodium are dissolved in 300 ml of tert.-butanol and 81.4 g of N,N-bis-(β-cyanoethyl)-n-butylamine are added dropwise over the course of 2 hours at 50° C, while stirring. Thereafter, the solution is kept at 50° C for a further 3 hours and is left to stand overnight at room temperature, and the solution is then concentrated on a rotary evaporator. The residue is recrystallized from 100 ml of toluene. After filtering off and washing with a little toluene, the crystals are dried at 40° C in vacuo. Yield: 36.9 g (45.4 percent) of 1-n-butyl-4-amino-3-cyano-1,2,5,6-tetrahydropyridine of melting point 69.5° – 70.5° C.

The filtrate is concentrated and the residue is recrystallized from 30 ml of toluene and 60 ml of petroleum ether. A further 21.5 g of melting point 69°–70.5° C are obtained, so that the total yield rises to 58.4 g (71.8 percent).
Analysis: $C_{10}H_{17}N_3$ (M = 179.27)
Calculated: C 67.01  H 23.44
Found: C 67.18  H 23.65

Stage II: 85.5 g of the 1-n-butyl-4-amino-3-cyano-1,2,5,6-tetrahydropyridine manufactured in the 1st stage are hydrogenated in 250 ml of ethanol and 80 g of ammonia over the course of 4 hours in an autoclave at 110° C and 100atmospheres, in the presence of 10 g of Raney nickel. The catalyst is filtered off, and the hydrogenation mixture is first distilled without a column, yielding 66.8 g of boiling point 80°–141° C. the fractional distillation through a rotating strip column yields 59.0 g (67.0 percent) of 1-n-butyl-4-amino-3-aminomethylpiperidine of boiling point 136°–138° C/9 mm Hg.
Analysis: $C_{10}H_{23}N_3$ (M = 185.31)
Calculated: C 64.81  H 12.51  N 22.67
Found: C 64.83  H 12.50  N 22.84

1-n-butyl-4-aminopiperidine is obtained as a byproduct from the first runnings.

EXAMPLE C

Manufacture of 1-isopropyl-4-amino-3-aminomethylpiperidine

Stage I: 1.0 g of sodium is dissolved in 200 ml of tert.-butanol, 84 g of N,N-bis-(β-cyanoethyl)-isopropyl-amine are then added all at once at 60° C, and thereafter the mixture is warmed to 60° C for 6 hours. It is concentrated on a rotary evaporator and the residue is recrystallized from 100 ml of toluene. After filtering off and washing with cyclohexane, to which a little benzene has been added, the crystals are dried in vacuo at 50° C. Yield: 57.3 g of 1-isopropyl-4-amino-3-cyano-1,2,5,6-tetrahydropyridine; melting point 80° C.

The filtrate, after concentration and recrystallization from 60 ml of cyclohexane, yields a further 6.1 g of melting point 79°–80° C. Total yield: 63.4 g (75.5 percent).

For analytical purposes, 2.0 g of the substance obtained were recrystallized from 5 ml of toluene. Yield: 690 mg; melting point: 79.5°–80° C.
Analysis: $C_9H_{15}N_3$ (M = 165.24)
Calculated: C 65.42  H 9.15  N 25.43
Found: C 65.82  H 9.00  N 25.17

Stage II: 91 g of the 1-isopropyl-4-amino-3-cyano-1,2,5,6-tetrahydropyridine manufactured in the 1st stage are hydrogenated in 300 ml of ethanol and 100 g of ammonia, in the presence of 10 g of Raney nickel, over the course of 2 hours in an autoclave at 125° C and a pressure of 100 atmospheres, the catalyst is filtered off, the solution is concentrated on a rotary evaporator. Distillation of the of the residue, without a column, in vacuo yields 78.9 g of crude amine of boiling point 110°–210° C/9 mm Hg. The fractional distillation through a rotating strip column yields 67.9 g (72.1 percent) of 1-isopropyl-4-amino-3-aminomethylpiperidine of boiling point 130° C/10 mm Hg.
Analysis: $C_9H_{21}N_3$ (M = 171.29)
Calculated: C 63.11  H 12.36  N 24.53
Found: C 63.12  H 12.44  N 24.78

EXAMPLE D

Manufacture of 1-cyclohexyl-4-amino-3-aminomethylpiperidine

Stage I: 500 mg of sodium are dissolved in 100 ml of tert.-butanol, 50 g of N,N-bis(β-cyanoethyl)-cyclohexylamine are added dropwise over the course of 1½ hours while stirring, and the mixture is thereafter heated to 60° C for a further 12 hours; in the course thereof, crystals separate out. After standing for two days at room temperature, the crystal sludge is filtered off, washed with cyclohexane and dried in vacuo at 50° C. Yield: 34.8 g of 1-cyclohexyl-4-amino-3-cyano-1,2,5,6-tetrahydropyridine; melting point 128°–129° C.

The filtrate yields a further 5.5 g of melting point 125°–127° C. Total yield 40.3 g (80.8percent).

For analysis 1.0 g of the substance obtained was recrystallized from 10 ml of cyclohexane. Yield: 520 mg; melting 128.5° – 129° C.
Analysis: $C_{12}H_{19}N_3$ (M = 205.31)
Calculated: C 70.20  H 9.33  N 20.47
Found: C 70.33  H 9.29  N 20.37

Stage II: 134.8 g of the 1-cyclohexyl-4-amino-3-cyano-1,2,5,6-tetrahydropyridine obtained in the 1st stage, in 300 ml of ethanol and 100 g of ammonia, are hydrogenated in an autoclave with 7 g of Raney nickel at 110°–115° C and a pressure of 100 atmospheres. After removing the catalyst and the solvent, the mixture is first distilled in vacuo without a column; this yields 116.6 g of crude amine of boiling point 170°–200° C/10 mm Hg. Fractional distillation through a rotating strip column yields 104.7 g (75.5 percent) of 1-cyclohexyl-4-amino-3-aminomethylpiperidine of boiling point 174° C/9 mm Hg. 1-Cyclohexyl-4-aminopiperidine can be detected in the first runnings.
Analysis: $C_{12}H_{25}N_3$ (M = 211.35)
calculated: C 68.20  H 11.92  N 19.88
Found: C 68.43  H 11.97  N 19.79

The mass spectrum agrees with the formula which has been indicated.

EXAMPLE E

Manufacture of 1-benzyl-4-amino-3-aminomethylpiperidine 107.5 g of 1-benzyl-4-amino-3-cyano-1,2,5,6-tetrahydropyridine [manufactured according to Taylor, Tetrahedron 23, 885 (1967)] in 300 ml of ethanol and 100 g of ammonia are hydrogenated in an autoclave with 10 g of Raney nickel at 115°–120° C and 100 atmospheres. After removing the catalyst and the solvent, the mixture is distilled in vacuo without a column. Yield: 82.7 g of crude amine of boiling point 115°–160° C/0.3 mm Hg. Fractional distillation through a rotating stip column yields 76.8 g (69.5 percent) of 1-benzyl-4-amino-3-aminomethylpiperidine of boiling point 190°–192° C/10 mm Hg.
Analysis: $C_{13}H_{21}N_3$ (M = 219.33)
Calculated: C 71.19  H 9.65  N 19.16
Found: C 70.68  H 9.68  N 19.15

EXAMPLES OF USES

EXAMPLE 1 a. 66 parts of epoxide resin A and 12.5 parts of 1-methyl-4-amino-3-aminomethylpiperidine (corresponding to a ratio of epoxide equivalent : nitrogen-bonded active H atoms = 1.0 : 1.0) were mixed at room temperature (25° C), degassed in vacuo and poured into aluminum moulds. The mixture gelled, the reaction being exothermic. After cooling, the mixture was post-cured for a further 24 hours at 100° C.

The castings obtained had the following properties:

| | |
|---|---|
| Flexural strength according to VSM 77,103 | = 15.1 kg/mm² |
| Deflection according to VSM 77,103 | = 11.5 mm |
| Impact strength according to VSM 77,105 | = 47 cmkg/cm² |
| Water absorption (24 hours, 20°C) | = 0.11 % |
| Glass transition temperature, measured by means of the DSC 1 *) | = 116°C |

*) Differential Scanning Calorimeter (according to Perkin-Elmer)

b. Castings having the following properties were obtained by pouring the curable mixture described under a) into moulds of size 140 × 140 × 4 mm. prewarmed to 40° C, and curing for 4 hours at 80° C and 12 hours at 140° C:

| | |
|---|---|
| Flexural strength | = 14.5 kg/mm² |
| Deflection | = 14 mm |
| Impact strength | = 18 cmkg/cm² |
| Heat distortion point according to ISO R 75 | = 87 °C |

EXAMPLE 2

35.7 parts of 1-methyl-4-amino-3-aminomethyl-piperidine and 224 parts of epoxide resin B were mixed and further processed as described in Example 1b).

The mouldings obtained had the following properties:

| | |
|---|---|
| Heat distortion point according to DIN 53,461 | 92°C |
| Flexural strength according to VSM 77,103 | 7.5 kg/mm² |
| Deflection according to VSM 77,103 | 5.8 mm |
| Impact strength according to VSM 77,105 | 10.6 cmkg/cm² |
| Glass transition temperature* | 107°C |

*measured in the Differential Scanning Calorimeter (DSC–1), using a heating speed of 16°C/min.

EXAMPLE 3

35.7 parts of 1-methyl-4-amino-3-aminomethyl-piperidine and 155 parts of epoxide resin C were mixed and further processed as in Example 1b).

The mouldings obtained had the following properties:

| | |
|---|---|
| Heat distortion point according to DIN 53,461 | 97°C |
| Flexural strength according to VSM 77,103 | 9.2 kg/mm² |
| Deflection according to VSM 77,103 | 2.9 mm |
| Impact strength according to VSM 77,105 | 9.6 cmkg/cm² |
| Tensile strength according to VSM 77,101 | 7.1 kg/mm² |
| Elongation at break according to VSM 77,101 | 10.0% |
| Glass transition temperature (DSC–1) | 113°C |

EXAMPLE 4

42.8 parts of 1-isopropyl-4-amino-3-aminomethyl-piperidine and 185 parts of epoxide resin A were mixed and further processed as in Example 1b).

The mouldings obtained had the following properties:

| | |
|---|---|
| Heat distortion point according to DIN 53,461 | 154°C |
| Flexural strength according to VSM 77,103 | 14.4 kg/mm² |
| Deflection according to VSM 77, 103 | 11.8 mm |
| Impact strength according to VSM 77,105 | 37.0 cmkg/cm² |
| Tensile strength according to VSM 77,101 | 8.9 kg/mm² |
| Elongation at break according to VSM 77,101 | 11.3% |
| Glass transition temperature (DSC–1) | 163°C |
| Water absorption (1 day; 20°C) | 0.19% |

EXAMPLE 5

46.2 parts of 1-n-butyl-4-amino-3-aminomethyl-piperidine and 185 parts of epoxide resin A were mixed and further processed as in Example 1b).

The mouldings obtained had the following properties:

| | |
|---|---|
| Heat distortion point according to DIN 53,461 | 123°C |
| Flexural strength according to VSM 77,103 | 13.0 kg/mm² |
| Deflection according to VSM 77,103 | 14.1 mm |
| Impact strength according to VSM 77,105 | 39.0 cmkg/cm² |
| Tensile strength according to VSM 77,101 | 7.5 kg/mm² |
| Elongation at break according to VSM 77,101 | 9.0% |
| Glass transition temperature (DSC–1) | 142°C |
| Water absorption (1 day; 20°C) | 0.21% |

EXAMPLE 5

52.7 parts of 1-cyclohexyl-4-amino-3-aminomethyl-piperidine and 185 parts of epoxide resin A were mixed and further processed as in Example 1b).

The mouldings obtained had the following properties:

| | |
|---|---|
| Heat distortion point according to DIN 53,461 | 154°C |
| Flexural strength according to VSM 77,103 | 14.9 kg/mm² |
| Deflection according to VSM 77,103 | 11.6 mm |
| Impact strength according to VSM 77,105 | 31.0 cmkg/cm² |
| Tensile strength according to VSM 77,101 | 7.1 kg/mm² |
| Elongation at break according to VSM 77,101 | 8.7% |
| Glass transition temperature (DSC–1) | 166°C) |
| Water absorption (1 day; 20°C) | 0.18% |

EXAMPLE 7

54.7 parts of 1-benzyl-4-amino-3-aminomethyl-piperidine and 185 parts of epoxide resin A were mixed and further processed as in Example 1b).

The mouldings obtained had the following properties:

| | |
|---|---|
| Heat distortion point according to DIN 53,461 | 146°C |
| Flexural strength according to VSM 77,103 | 14.6 kg/mm² |
| Deflection according to VSM 77,103 | 12.2 mm |
| Impact strength according to VSM 77,105 | 41.0 cmkg/cm² |
| Tensile strength according to VSM 77,101 | 8.6 kg/mm² |
| Elongation at break according to VSM 77,101 | 10.4% |
| Glass transition temperature (DSC–1) | 156°C |
| Water absorption (1 day; 20°C) | 0.17% |

I claim:

1. A composition of matter which comprises (a) a 1,2 polyepoxide having an average of more than one epoxide group in the molecule and (b) as the curing agent, a substituted 4-aminomethylpiperidine of the general formula

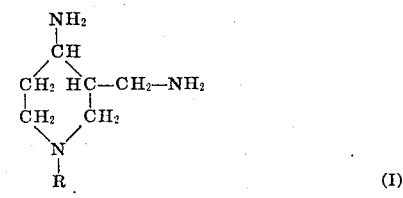

(I)

wherein R represents a member selected from the group consisting of an alkyl with one to seven carbon atoms, an alkenyl with one to seven carbon atoms, cycloalkyl, cycloalkenyl, phenyl and benzyl, said composition containing 0.5 to 1.3 equivalents of nitrogen-bonded active hydrogen atoms of the substituted 4 amino-3-aminomethylpiperidine (b) per equivalent of epoxide groups of the polyepoxide (a).

2. A composition as claimed in claim 1, which contains 1-methyl-4-amino-3-aminomethylpiperidine as the curing agent (b).

3. A composition as claimed in claim 1, which contains 1-n-butyl-4-amino-3-aminomethylpiperidine as the curing agent (b).

4. A composition as claimed in claim 1, which contains 1-isopropyl-4-amino-3-aminomethylpiperidine as the curing agent (b).

5. A composition as claimed in claim 1, which contains 1-cyclohexyl-4-amino-3-aminomethylpiperidine as the curing agent (b).

6. A composition as claimed in claim 1, which contains 1-benzyl-4-amino-3-aminomethylpiperidine as the curing agent (b).

7. A composition as claimed in claim 1, which contains a polyepoxide (a) with an average of more than one glycidyl group, β-methyl-glycidyl group or 2,3-epoxycyclopentyl group, bonded to a hetero-atom, in the molecule.

8. A composition as claimed in claim 1, which contains a polyglycidyl ether of a polyhydric phenol as the polyepoxide (a).

9. A composition as claimed in claim 8, which contains a polyglycidyl ether of 2,2-bis-(p-hydroxyphenyl)-propane as the polyepoxide (a).

10. A composition as claimed in claim 1, which contains a polyglycidyl ether of a cycloaliphatic polyol as the polyepoxide (a).

11. A composition as claimed in claim 10, which contains a polyglycidyl ether of 2,2-bis-(p-hydroxycyclohexyl)-propane as the polyepoxide (a).

12. A composition as claimed in claim 1, which contains a polyglycidyl ester of a polycarboxylic acid as the polyepoxide (a).

13. A composition as claimed in claim 12, which contains the diglycidyl ester of $\Delta^4$-tetrahydrophthalic acid or hexahydrophthalic acid as the polyepoxide (a).

* * * * *